3,380,868
METHOD FOR PRODUCING AND ORIENTING POLYPROPYLENE FILMS
Rabin Moser, Oriskany, N.Y., assignor to National Distillers and Chemical Corporation, New York, N.Y., a corporation of Virginia
No Drawing. Filed Nov. 19, 1963, Ser. No. 324,868
15 Claims. (Cl. 156—229)

ABSTRACT OF THE DISCLOSURE

A method for producing a relatively thick and oriented thermoplastic film which comprises contacting at least two thin layers of film which then are stretched at an elevated temperature to provide a substantially homogeneous oriented film having high gloss, low haze, and stable high tensile impact properties.

---

This invention relates to a method for manufacturing novel polypropylene films, and more particularly to a method for preparing oriented polypropylene films having high gloss, low haze and stable, high tensile impact properties.

In recent years the commercial applications of thermoplastic film in the field of flexible film packaging have been continually increasing. Self supporting thermoplastic films such as polypropylene film are characterized by high resistance to moisture vapor transmission. This property is of particular advantage in the packaging of moist foods with these films because the moisture content of the packaged foods is substantially retained over long periods of time. Another desirable property of polypropylene is its transparency, which enables easy visual identification of the food products packaged in such films. In addition, the polypropylene film is tough, flexible at low temperatures, stable up to temperatures quite close to its softening temperature, and is resistant to most solvents and chemicals. The polypropylene film has the further advantage of being nontoxic, odorless and tasteless.

It is well known that the physical properties such as clarity, gloss, tensile strengths and low temperature brittleness of polypropylene films can be improved by orientation. Relatively thin films of oriented polypropylene in the order of 0.5 mil are markedly superior in properties such as tensile modulus, tensile strength, elongation, impact strength and shrink energy to unoriented polypropylene film. The orientation is accomplished by heating the film and stretching it in a longitudinal direction and/or transverse direction. Upon cooling, the film retains its stretched configuration.

Relatively thin oriented polypropylene film, i.e. having a gauge less than about 0.5 mil, possesses desirable high gloss, low haze and stable, high tensile impact properties. Thicker polypropylene films which have been oriented in tenter frame operations at high speeds, for example, to produce an oriented polypropylene film having gauges of the order of 1 mil, are, however, somewhat deficient in these properties. Such polypropylene film products particularly are subject to a marked degradation of the tensile impact properties as well as having a much poorer appearance. Efforts to combine or laminate relatively thin polypropylene films which have previously been separately oriented proved to be either too costly or ineffective for producing a commercial product.

In order to provide the aforementioned desirable properties of relatively thin polypropylene films in thicker films having gauges of at least 1 mil, it would be desirable to form a laminate of two or more such thin films. However, due to the relatively poor adhesive and cohesive properties of polypropylene, such laminates are frequently weak and can even be delaminated by manual stripping. Such a lamination process would also be relatively expensive for large scale commercial operations.

It is accordingly an object of the present invention to provide a method for producing the effect of combining a plurality of thin polypropylene films to obtain thicker oriented polypropylene film products or structures having the desirable physical properties of thin oriented polypropylene films.

A further object of the present invention is to provide a method for the production of relatively thick oriented polypropylene film products or structures, which are substantially homogeneous and which cannot be readily separated into individual layers or laminae.

For a more complete understanding of the nature and objects of this invention, reference is made to the following detailed description thereof.

In accordance with the present invention, it has now been found that if two or more unoriented polypropylene base films having thicknesses of less than about 10 mils, and preferably from about 1 to about 4 mils, are secured together by bringing the films into intimate contact while simultaneously heating them at a temperature sufficient to promote good surface contact without the inclusion of air, gas or any foreign material, and thereafter orienting the resulting film structure, an oriented polypropylene film product or structure results having a thickness of at least about 0.5 mil, and preferably from about 0.5 to about 10 mils, and possessing the desirable properties discussed above. Employing such a procedure, including a high speed sequential orientation process, it has been found possible to provide relatively thick oriented polypropylene film products having excellent tensile impact properties, gloss values of the order of 90% and haze values of about 1% or less. Moreover, the orientation or stretching step of this fabrication method assists in randomizing the gauge variations of the polypropylene base films and improves the roll geometry of the relatively thick film product. As previously noted, the individual base films are no longer separately identifiable, and it is impossible to effect any physical separation of the same.

While it is preferred to produce oriented polypropylene film product structures having thicknesses of from about 0.5 to about 10 mils, it will be understood that, in accordance with the invention, two or more relatively thin unoriented polypropylene base films, which may have varying thickness, can be combined to produce oriented film products or structures having any thickness, depending upon the type of product desired.

In a preferred method for the production of the oriented polypropylene film product of this invention, the combined polypropylene base films are stretched, initially in a longitudinal direction, then in a transverse direction, i.e., biaxial orientation, and if balanced orientation is desired the transverse direction stretching may be followed by a second longitudinal stretch step. In the lamination process of the present invention the unoriented polypropylene base film layers may be brought into intimate contact with one another prior to any one of these stretching steps in order to form the desired composite oriented film product or structure. The films, for example, may be brought into intimate contact before the initial longitudinal stretching of the base polypropylene films, subsequent to the initial longitudinal stretching and prior to the transverse stretching, or subsequent to the transverse stretching and prior to the second longitudinal stretching step. In all instances an oriented polypropylene film is produced having tensile impact properties and optical properties superior to those of films of equal thickness made from a single base film or sheet and equivalent to films which might be made by laminating several very thin, individually oriented polypropylene films.

In the most preferred method of operation of the present invention, the component polypropylene films or layers are brought into intimate contact prior to the initial longitudinal stretching step. The base films before being brought into intimate contact are heated, for example, by passing them through a heated oven or over a heated roller or series of heated rollers. This preheating enhances the adherence and contacting of the thermoplastic layers when they are brought into intimate contact to permit subsequent processing of the composite film structure during stretching operations. Moreover, this initial bonding of the film layers helps to prevent the entrapment of air between the layers during the combining step and minimizes separation of the layers during handling of the film prior to the next stretching step. This insures complete and uniform welding of the base films. It has been observed that the composite film structure which results from this initial step may be quite easily separated into film layers by simply manual stripping. Film interlayer adhesion of this stage of the process is extremely poor. In accordance with the method of this invention, the resulting combination film structure is subsequently stretched sequentially: first in a longitudinal direction and then in a transverse direction.

It has been found that a sequential operation comprising the steps of the first imparting a longitudinal orientation followed by a transverse orientation followed by a transverse orientation of the composite base film structure can be effectively employed to produce the oriented polypropylene film product or structure of the present invention. It will be understood, however, that other methods of orientation may be employed such as simultaneous biaxial orientation, wherein the film layers are stretched in a longitudinal and transverse direction at the same time as described in U.S. Patent No. 3,048,895. The stretching may also be carried out in sequential steps, i.e., a longitudinal stretching followed by transverse stretching, or the orientation may be uniaxial, i.e., the laminate structure is stretched only in a transverse direction or only in a longitudinal direction.

In an illustrative embodiment of the method of this invention, the unoriented base polypropylene films can be combined as the base feed structure are separately subjected to a stretching operation to achieve machine or longitudinal direction orientation. In general, the longitudinal orientation step is carried out at a temperature ranging from about 200° to 300° F., and generally about 230° to 270° F. The composite film structure is stretched from about 20 to 300% and preferably from about 30 to 100%, or in a stretching ratio of about 1.3:1 to 2:1 in the machine direction by means of the longitudinal orientation system.

In general the longitudinal orientation system comprises a group of closely-spaced, parallel rolls generally designated as "slow" rolls, followed by a group of closely-spaced, parallel rolls driven at a higher speed and designated as "fast" rolls. The slow rolls are maintained at an elevated temperature of about 200° to 350° F. by means of heated oil circulating there-through or by the employment of various other heating mediums. The fast rolls are generally equipped for the internal circulation of cooling water and may, if desired, be cooled or allowed to run neutral.

The temperature of the polypropylene film during the longitudinal stretching will generally vary from about 220° to 300° F. at a point where actual stretching occurs. The rate at which the polypropylene film is stretched may obviously vary over a wide range depending on such factors as the particular apparatus utilized, etc. In general, the film rate will range from about 10 to 1,000 feet per minute.

The particular method described above, i.e., longitudinal orientation of the base polypropylene films prior to intimate contact and combination to form the base polypropylene film or sheet structure, has been found to be particularly advantageous in that thinner films can be combined which insures against layer separation or blistering.

After the step of longitudinal orientation the thin polypropylene films are brought into intimate contact with one another by preheating the longitudinally oriented films at elevated temperatures about 200° F. above room temperature, and passing the resulting structure through a series of pressure rolls.

The combined polypropylene film structure is subsequently stretched in a transverse direction to produce a biaxially oriented polypropylene film product. This transverse stretching may be accomplished by the employment of a textile-type tenter frame suitably modified for handling plastic webs. The tenter frame is housed in an oven which is divided into temperature-controlled zones wherein the composite film structure is heated by hot gas impingement as it is being transversely stretched. The entire length of the tenter frame is provided with chains carrying a continuous succession of clamps or clips for gripping and moving the composite film structure through the lateral stretching process. As the composite film structure is fed into the tenter frame, it is directed between the parallel rows of tenter clips, and these tenter clips grip the edges of the polypropylene base structure and move outwardly as the chains progress through the tenter frame to stretch the film transversely. At the end of the tenter frame, the film is released from the clips and the empty clips are returned by the chain to the front end of the tenter frame for engagement with the composite web structure.

The number of oven zones within the tenter assembly may vary for the purposes of the present invention, however it is preferred to have at least four zones. The first zone is a preheat zone where the composite film structure is preheated to temperatures ranging from about 250° to 340° F. by circulating hot gas, e.g., air, as it is moved through the zone, before initiation of the stretching operation which is accomplished in the subsequent zones.

In the second and third oven zones the gripped superposed films are maintained at elevated temperatures, and the sides of the tenter frame diverge sharply to obtain a stretch ratio of about 6:1 to 12:1 and preferably about 8:1.

The fourth oven zone is the annealing or heat setting zone in which the transversely stretched polypropylene film structure is subjected to an elevated temperature within the range of about 300° to 350° F., preferably about 325° F., while the film is maintained under transverse and longitudinal tension.

Following the annealing treatment the oriented polypropylene film, while still under tension, is blown with air to cool the structure to near ambient temperature, i.e. about 80° to 120° F.

After leaving the tenter frame, the released oriented polypropylene film product is passed through a set of trim knives where the unstretched edges which have been held in the clips are removed, and the laminate is taken up on a conventional wind-up roller system. As previously pointed out, improved roll geometry results along with improvement in both the physical and optical properties.

Samples of a biaxially oriented polypropylene film structure produced in accordance with the particular method described above and starting with two unoriented polypropylene feed films, at a line speed of 110 feet per minute, were tested for haze, gloss and tensile impact properties and compared in these respects with a biaxially oriented monolayer polypropylene film having approximately the same finished thickness and prepared by the same orientation procedure. The composite polypropylene film had an average thickness of about 9 mils after the two individual polypropylene films each having an average thickness of about 3 mils were combined, whereas the average thickness of the monolayer polypropylene base film employed in preparing the oriented film product having the properties described in Column B below was also about 6 mils. The results are tabulated in the following table:

|  | Oriented Composite Film | Oriented Monolayer Film |
| --- | --- | --- |
| Average Gauge (mils) | 0.886 | 0.882 |
| Average Haze (percent) | 1.2 | 2.0 |
| Average Gloss (percent) | 84.0 | 80.4 |
| Tensile Impact (M.D., ft.-lbs./in.³):[1] | | |
|   High | 2,580 | 575 |
|   Low | 1,740 | 0 |
|   Average | 2,165 | 205 |
| Yield (M.D., p.s.i.) | 5,690 | 4,840 |
| Ultimate Strength (M.D., p.s.i.) | 9,710 | 6,980 |
| Modulus (M.D., p.s.i.) | 176,000 | 171,000 |

[1] M.D.=Machine or Longitudinal Direction.

As is apparent from the preceding table, the properties of the oriented polypropylene film product produced in accordance with the invention (Column A) are markedly superior to those of the monolayer oriented polypropylene film having substantially the same gauge. In particular, as compared with the other oriented polypropylene film product, the oriented film product prepared by the method of this invention possesses stable, superior high tensile impact properties.

It will be noted that the present invention thus provides a process for starting a plurality of thin polypropylene films upon a single such film or a similar polyethylene film to produce an oriented film product or structure which has the desirable gloss, haze and tensile impact properties, and which oriented film product is essentially homogeneous and cannot be separated into individual layers. Since certain changes may be made in the specific embodiment of the orientation method described without departing from the scope of the invention, it is intended that all matter contained in the above description shall be interpreted as illustrative only.

It will also be understood that the method of this invention may also be varied or modified without departing from its broader aspects. Thus, for example, many separate polypropylene films, and preferably about 2 to 10 or more separate polypropylene films, may be combined to form the novel oriented polypropylene product or structure of this invention. It is also possible to extrude polypropylene film directly on a polypropylene base film prior to orientation or after longitudinal but prior to transverse orientation. Moreover, a wide unoriented polypropylene base film can be slit into a plurality of narrower film and then combined, as described above, to form the base polypropylene structure of this invention. Another possibility would involve the extrusion of a polypropylene tube followed by a collapsing step to form the starting polypropylene structure which can be effectively employed to prepare the oriented polypropylene product encompassed by the present invention. In accordance with another feature of this invention, it has been found that off grade or inexpensive polypropylene resins can be effectively employed to prepare the novel oriented polypropylene products, if a high grade material of good optical properties is used as the outer layers.

What is claimed is:

1. A method for the preparation of relatively thick oriented polypropylene film having excellent physical and optical properties which comprises contacting at least two separate, relatively thin polypropylene films having high gloss, low haze, and stable, high tensile impact properties, and then stretching the resulting combination of polypropylene films at an elevated temperature to form a relatively thick, substantially homogeneous oriented polypropylene film substantially retaining said gloss, haze and high tensile impact properties.

2. The method of claim 1 in which said relatively thin polypropylene films have a thickness of not less than about 4 mils, and the oriented polypropylene film produced therefrom has a thickness greater than about 0.5 mil.

3. The method of claim 1 wherein said stretching is carried out in a longitudinal direction.

4. The method of claim 1 wherein said stretching is carried out in a transverse direction.

5. The method of claim 1 wherein said stretching is carried out sequentially in a longitudinal direction and a transverse direction to obtain a biaxially oriented polypropylene film product.

6. The method of claim 1 wherein said stretching is carried out sequentially in a longitudinal direction, a transverse direction and a longitudinal direction to obtain a balanced biaxially oriented polypropylene film product.

7. A method for the preparation of an oriented polypropylene film which comprises securing together at least two separate relatively thin polypropylene films having high gloss, low haze, and stable, high tensile impact properties under elevated temperature and pressure and orienting the resulting film combination at an elevated temperature whereby said relatively thin polypropylene film combination forms an oriented, substantially homogeneous polypropylene film product substantially retaining said gloss, haze and high tensile impact properties.

8. The method of claim 7 wherein said relatively thin polypropylene film combination is biaxially oriented sequentially in a longitudinal direction and a transverse direction.

9. The method of claim 7 wherein the number of relatively thin polypropylene films employed to form the polypropylene film combination is within the range of about 2 to 10.

10. A method of combining at least two relatively thin polypropylene layers to produce a thicker, substantially homogeneous, oriented polypropylene film product characterized by excellent stability, high tensile impact and high gloss and low haze properties, which comprises preheating at least two polypropylene layers to a temperature of at least 200° F., securing the preheated layers together by contacting them under pressure, stretching the resulting polypropylene layer combination in a longitudinal direction at a ratio of at least 1.2:1 and a temperature of at least 200° F., and then stretching the resulting polypropylene layer combination in a transverse direction at a ratio of at least 6:1 at a temperature of at least 250° F. to produce a biaxially oriented, substantially homogeneous polypropylene layer product.

11. The method of claim 10 wherein about 2 to 10 layers of polypropylene are employed to form the biaxially oriented polypropylene layer product.

12. The method of claim 10 wherein said oriented polypropylene layer product has a thickness of at least about 0.5 mil.

13. The method of claim 10 wherein said biaxially oriented polypropylene layer product is further subjected to a second longitudinal stretching step to obtain a balanced biaxially oriented polypropylene layer product.

14. A method for the preparation of a relatively thick oriented polypropylene film product which comprises longitudinally stretching a polyethylene base film, contacting said longitudinally oriented base film with at least one unoriented polypropylene film under elevated pressure to form a polypropylene film combination, and then stretching the resulting polypropylene film combination under elevated temperature conditions in a transverse direction to form a relatively thick, substantially homogeneous oriented polypropylene film product having excellent physical and optical properties.

15. The method of claim 14 wherein said oriented polypropylene base film is intimately contacted with from about 2 to 10 unoriented polypropylene films to form said polypropylene film combination.

References Cited

UNITED STATES PATENTS 3,003,903  10/1961  Vaughan _____ 156—229
3,187,982  6/1965  Underwood et al. ____ 156—244

ROBERT F. BURNETT, *Primary Examiner.*

MORRIS SUSSMAN, *Examiner.*

W. J. VAN BALEN, *Assistant Examiner.*